United States Patent
Di Peri

[15] 3,693,367
[45] Sept. 26, 1972

[54] THERMODYNAMIC CONTROL DEVICE

[72] Inventor: Leonard J. Di Peri, 18325 Lahey St., Northridge, Calif. 91324

[22] Filed: April 24, 1970

[21] Appl. No.: 31,624

[52] U.S. Cl. .......................... 62/45, 62/54, 62/527, 220/9 LG
[51] Int. Cl. .................................... F17c 7/00
[58] Field of Search ...... 220/9 LG, 12, 15; 62/45, 54, 62/527; 165/105

[56] References Cited

UNITED STATES PATENTS

| | | |
|---|---|---|
| 3,365,897 | 1/1968 | Middleton et al. ............. 62/45 |
| 2,676,773 | 4/1954 | Sanz et al. ............... 220/9 A X |
| 2,859,895 | 11/1958 | Beckwith ..................... 220/65 |
| 2,947,438 | 8/1960 | Clauson ..................... 220/15 |
| 2,937,780 | 5/1960 | Beckwith ................. 220/9 LG |
| 3,018,018 | 1/1962 | Beckwith ..................... 220/63 |
| 3,019,937 | 2/1962 | Morrison ............. 220/9 LG X |
| 3,150,794 | 9/1964 | Schlumberger et al..220/9 LG |
| 3,208,621 | 9/1965 | Dawson ................... 220/9 LG |
| 3,261,087 | 7/1966 | Schlumberger et al.... 220/9 A X |
| 3,325,037 | 6/1967 | Kohn et al. ................ 220/9 A |
| 2,702,460 | 2/1955 | Gaugler .................... 62/527 X |
| 3,130,561 | 4/1964 | Hnilicka, Jr. ......... 220/9 LG X |
| 2,719,583 | 10/1955 | Malick ...................... 62/54 X |

Primary Examiner—Meyer Perlin
Assistant Examiner—R. Capossela
Attorney—William H. Maxwell

[57] ABSTRACT

A device for the elimination of heat transfer out of and/or into a body of liquid material, and particularly applicable to cryogens contained at low temperature. Surface tension phenomenon and pressure are employed in establishing a gas barrier between the liquid and the structural container therefor, the pressure being applied to the gas barrier from an external source or accumulated from said liquid as it is liberated from said contained body thereof. The said body of liquid is constrained within the confines of a porous membrane and out of contact with containment walls by means of an intervening body of restraining gas maintained within a range of pressured equilibrium with the pressure prevailing in the constrained liquid and preferably at a pressure equal to or less than the bubble-point pressure of said membrane. Unobvious practicality resides in embodiments of the foregoing concept wherein substantially complete structural isolation of liquid from containment walls is maintained, thereby minimizing heat transfer.

13 Claims, 5 Drawing Figures

PATENTED SEP 26 1972 3,693,367
SHEET 1 OF 2
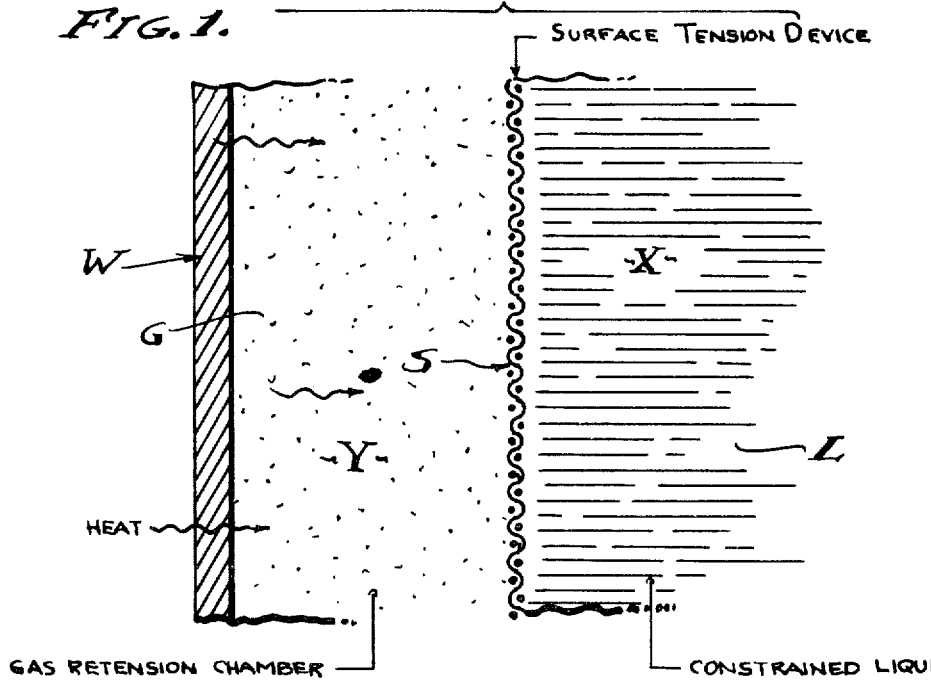
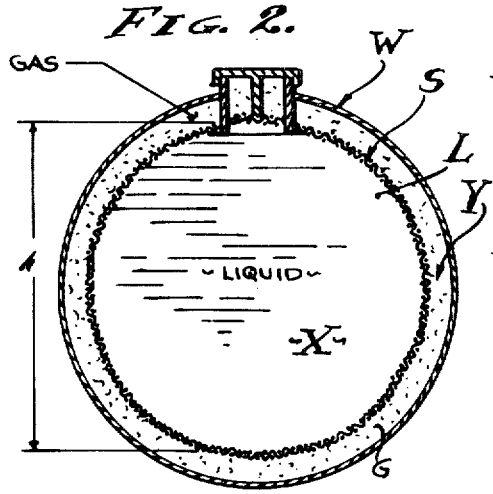
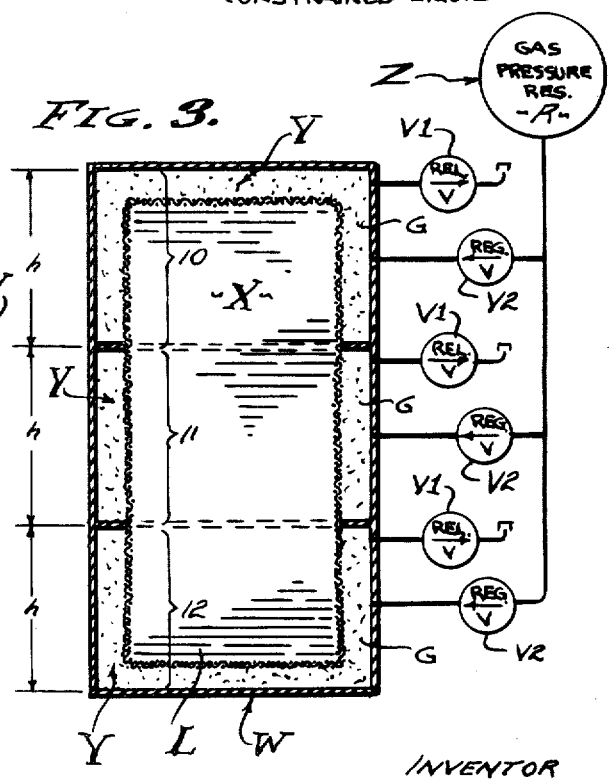
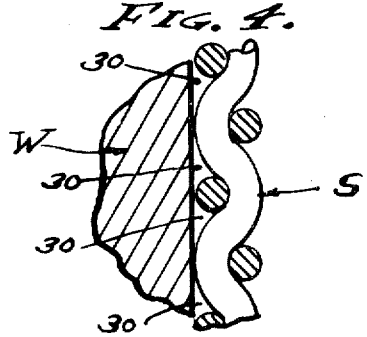
INVENTOR
LEONARD J. DiPERI

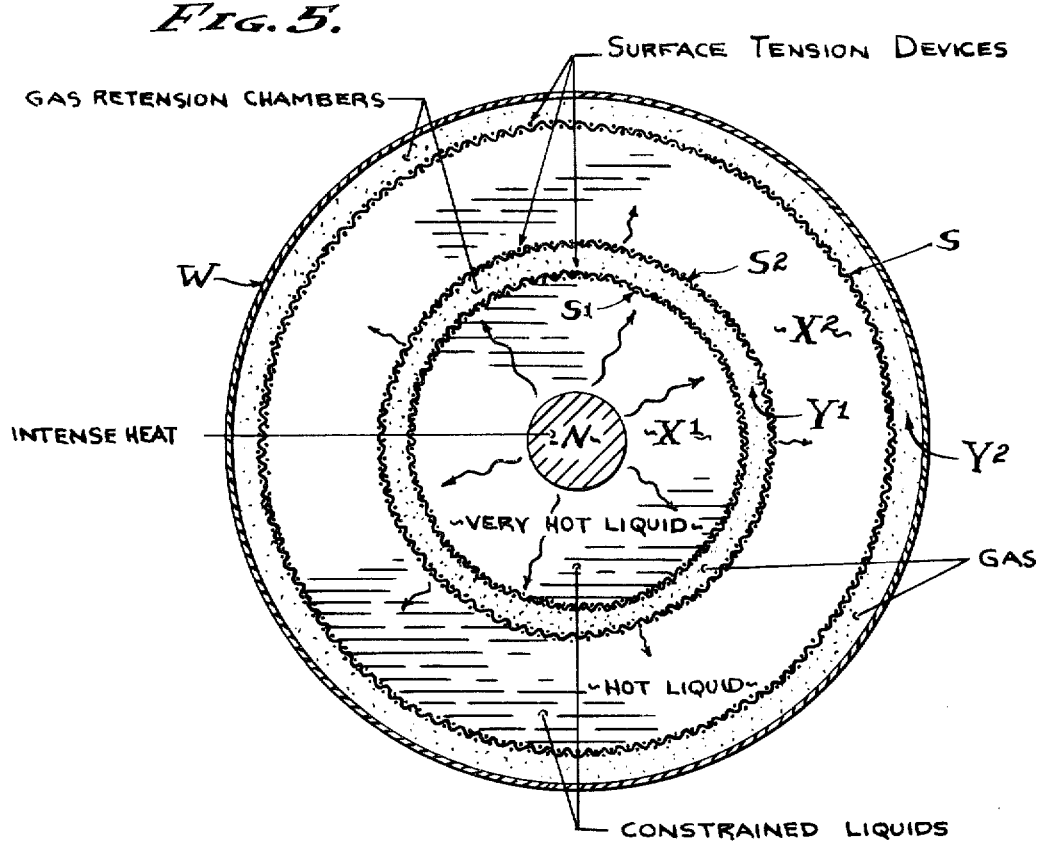

THERMODYNAMIC CONTROL DEVICE

The containment of cryogenic liquids over long time periods brings about problems relating to heat-cold and pressure. For example Liquid Nitrogen at −286° F, and other useful materials as low as −420° F, are contained in Dewar flasks and the like which rely upon double walls with a vacuum drawn therebetween and which require substantial mechanical integrity and consequent body for structural stability. Therefore at the very best, great weight and bulkiness is to be expected as a rule in the prior art containment of cryogens; and the same is true at the other extreme wherein hot liquids are to be contained, the use of known means for the prevention of heat transfer being a primary problem. It is an object of this invention to advantageously employ the unobvious surface tension phenomenon by constraining the liquid within the confines of a relatively lightweight porous membrane with a restraining gas maintained under suitable pressure within a chamber between said membrane and a containment wall, thereby replacing the usual heavy double or insulated walls and eliminating structural complexity, weight and bulk. A restrictive liquid to gas heat transfer is established and which permits only the gas to conduct heat by absorption and/or by radiation. Consequently cold and/or heat transfer is reduced proportionately in relation to the liquid density compared with the gas density, or in relation to the relative capabilities of the liquid and gas to transfer cold and/or heat. Therefore, the transfer of cold and absorption of heat is minimized by means within the container and to the end that the container is not relied upon for the primary thermo isolation. Extremely low heat leak is also made possible by applying this insulation technology within a Dewar flask, or by encapsulating the container embodying the same within suitable insulation.

The separation of liberated gas and entrained bubbles from stored liquid is a problem at best, and this is especially so with cryogenic liquids contained in mobile vessels subjected to inertial changes. Reference is made to cryogenic liquid stored in pressurized vessels and from which the liquid is to be extracted under non-gravity conditions compounded by inertial variations. It is an object with the use of this new surface tension thermal control device, as hereinafter disclosed, to provide stability at a liquid-gas interface and which establishes and maintains a gas collecting separation and to the end that liquid can be extracted independent of the gas, and vice versa all of the gas can be extracted independent of the liquid. Gas and liquid depletion can be controlled by suitable valving which maintains the required pressure equilibrium at the liquid-gas interface, where the liquid and gas are separated by the said surface tension device.

The obvious and expected results of confining liquid within a porous membrane is that flow of liquid occurs through the membrane as a function of the inescapable head of pressure in said liquid. The use of surface tension screens as the membrane, in liquid acquisition apparatus and the like, permits this draining flow while separating entrained bubbles of gas from the liquid. However, the primary object of this invention is to eliminate heat transfer in a stored liquid, and in this respect a surface tension screen is utilized as a membrane that establishes the position of the liquid-gas interface. In order to establish a positioned interface of liquid to gas, an equilibrium is established therebetween by means of maintaining said gas at a retention pressure within a range permitted by the bubble-point pressure of the particular screen employed. Thus, the only structural member subjected to substantial stress, external or internal pressure, is the container wall; the membrane or screen being hung or arrested in place so as to establish a retention-gas chamber. Said restraining gas is supplied or accumulated at an equilibrium pressure or within a range of pressure which constrains the liquid within the confines of the membrane screen by preventing droplets of liquid from emanating into said retention-gas chamber. The operative range of equilibrium pressure is substantial when utilizing fine pored surface tension membranes or screens, thereby permitting a large variation in liquid head. Accordingly, it is also an object of this invention to provide a multiplicity of gas-retention chambers and each pressured according to the operational range of equalibrium pressure required by the head of liquid to be constrained thereby in each instance.

The various objects and features of this invention will be fully understood from the following detailed description of the typical preferred form and application thereof, throughout which description reference is made to the accompanying drawings, in which:

FIG. 1 is a fragmentary sectional view showing the primary elements of the present invention with a body of liquid constrained thereby.

FIG. 2 is a cross sectional elevation showing a practical embodiment of the present invention.

FIG. 3 is a cross sectional elevation showing a second practical embodiment of the present invention.

FIG. 4 is an enlarged fragmentary sectional view illustrating a variation of the primary elements shown in FIG. 1. And FIG. 5 is a cross sectional view showing a third practical embodiment surrounding a nuclear heat source. The thermodynamic control device herein disclosed has varied applications to and in apparatus, equipment and machines or devices which handle and/or utilize liquids from which heat or cold transfer is to be prevented. For example, use of the present invention is contemplated for the insulated containment of liquids such as hydrogen at −420° F, as well as for the insulated containment of liquids such as sodium at +800° F. In either case the problems are the same in many respects and this thermo-control device is applicable to both extreme situations and to intermediate situations as well; the following disclosure being devoted to the cryogenic extreme, a best example thereof. The general purpose of the present invention is to contain liquid material in isolation from its material in isolation from its surrounding or next adjacent environment, so that heat transfer into or out of said material is minimized. It is also a purpose to accomplish the foregoing with a minimal and durable structure, and when the containment pressure varies from the environment pressure a pressure resistant containment wall is employed, said containment wall being the supporting structure of the device. A characteristic feature of the present invention is that the interior structure is not subjected to great differentials in pressure.

Referring now to the drawings, the thermodynamic control device comprises generally, a liquid chamber X defined by a surface tension membrane or screen S, and a gas retention chamber Y defined by the membrane or screen S, and a containment wall W, there being pressure control means Z determining the retention pressure within chamber Y. In practice, a screen can touch the containment wall W leaving interstices that establish the gas retention chamber Y (see FIG. 4). As shown, there is some and preferably a substantial distance between the surface tension member or screen S and the containment wall W, the restraining gas therebetween being maintained at equilibrium pressure equal to or less than the bubble point pressure of said membrane or screen S by means of the pressure control means Z.

The liquid chamber X is defined by the surface tension membrane or screen S that is a barrier establishing the interface between the liquid L and gas G. The chamber X can vary widely in configuration and purpose in that it can be a complete cell in itself or a part of some other apparatus or liquid handling device. For example, the chamber X can be a storage chamber, or a passage or any other like space occupied by the liquid to be insulated. Since a volume of liquid is necessarily involved, there will be a head $h$ (see FIGS. 2 and 3) of pressure applied to the constraining surface tension membrane or screen S, and this pressure will be by virtue of the liquid weight and determined by the columnar height thereof, and supplemented by any bias pressure used as circumstances may require. For example, a liquid hydrogen at one (1) gravity of acceleration force can be stored and used at $-420°$ F with a nineteen inch head $h$ or equivalent pressure. It is to be understood that the pressures within chamber X can vary as required.

The surface tension membrane or screen S establishes the liquid-gas interface or barrier and is any porous wall or like membrane, and is preferably an ultra fine mesh partitioning screen S through which the liquid tends to percolate and evaporate as a gas. In practice, the mesh or gradient of the surface tension screen S is such that fluid gas (G) will readily pass therethrough and such that liquid L will be constrained providing that the pressure of the restraining gas G within chamber Y is maintained at or in substantial equilibrium at or less than the bubble point pressure. Bubble point pressure varies with the density, temperature and surface tension of each fluid involved, and with the pore size and characteristics of the membrane as well; and is determined for example, by submerging the membrane in the fluid and pressurizing one side thereof until the first bubble appears at the other side thereof.

The gas retention chamber Y is established between the membrane or screen S and the wall W, there being substantial space therebetween. The wall W is the shell of a cell or container, or it can be a part of some other apparatus or liquid handling device. In any case, it is the wall W which is the primary structural member which sustains interior or exterior pressures as the case may be, and from which the membrane or screen S is held or spaced. The membrane or screen S is supported against, within or from the wall W by suitable means and in uniform spaced relation thereto, as shown. In carrying out this invention, the membrane or screen S is constructed and/or supported so as to have sufficient capability and strength to support and carry the liquid L, it being recognized that the liquid L has mass and is subject to inertial forces. However, it is unique herein that the restraining-gas G is maintained at or less than or in substantial equilibrium with the bubble point pressure and thereby reinforces the membrane or screen S. Consequently, it is feasible to increase the normal liquid carrying capability of the membrane or screen S by increasing the retention pressure of the restraining gas G commensurate to the bubble point pressure required in order to constrain percolation tending to occur as a result of prevailing liquid L pressure.

The containment wall W defines the outer extremety of the gas retention chamber Y, the surface tension membrane or screen S defining the inner boundry thereof. Wall W is the structural member of the device and is rigid or reinforced to withstand the retention pressure and supporting forces that are involved. The wall W can be a monocoque shell or any part or portion of a container, apparatus or liquid handling device.

The pressure control means Z is determinate of the retention pressure of the gas and in the broadest sense can be a vent to atmospheric pressure. However, extenuating conditions are accommodated by closing one or both chambers X and Y, and by increasing and/or decreasing the retention pressure, in which case the control means Z involves pressure regulation that accommodates gas G within the gas retention chamber Y. The control means Z varies in configuration dependent upon the properties of the liquid L and gas G, there being liquids L which liberate the gas G and there being liquids L which do not liberate gas (to any useable extent). In any case, the control means Z comprises means that maintains a retention pressure surrounding the membrane or screen S and in any situation requiring other than normal atmospheric pressure (14.7 pounds per square inch at sea level or the like) a pressure regulating valve or valves is employed for the supply to or exhaust of gas from the retention chamber Y. If it be the character of liquid L to liberate gas G, a relief valve V1 is employed to exhaust the retention chamber Y to the required pressure; or if it be the character of liquid L not to liberate gas G or to liberate insufficient gas G a regulator valve V2 is employed to supply the retention chamber Y with suitable gas under pressure from a reservoir R or the like. There are instances where the constrainment of liquid L and heat transfer is enhanced by the introduction into chamber Y of compatible or inert gases such as helium, it being advantageous in some instances to precharge the retention chamber Y, partially or completely, prior to or during filling of the chamber X with the liquid L to be contained therein. As shown, the control means Z involves regulation which includes both the relief valve valve V1 and the regulator valve V2, thereby maintaining a required retention pressure of restraining gas G, as circumstances require.

In accordance with the invention hereinabove disclosed there are many embodiments, forms and configurations in which the idea of means can be practiced. It will be observed that the bubble point pressure of the porous membrane or skin S is not to be exceeded and this imposes a recognized restriction on the head $h$ of pressure permitted within the liquid chamber X. However, this restriction is not to be construed as a limitation on liquid volume to be constrained as a function of height greater than $h$, and on the contrary the restraining gas retention chamber is vertically compartmented as shown in FIG. 3 in order to maintain the liquid to gas interface pressures in substantial equilibrium at or less than the bubble point pressure within predetermined depth ranges. That is, within each depth range 10, 11 and 12 the restraining gas pressure is at or less than the highest liquid head h pressure in that range, there being an increase in retention pressure within the retention chamber Y at each deeper range. The other extreme is equally feasible wherein high altitude and space environments are involved, and in each instance the retention pressure next adjacent to the permissible range of liquid head pressure is maintained at or less than the bubble point pressure of the membrane or screen S that presents the liquid-gas interface.

Referring to a fundamental embodiment of the invention, as shown in FIG. 2, a liquid storage cell is shown wherein both the membrane or screen S and containment wall W are closed, and wherein the over all height h of the screen S does not exceed one range of liquid pressure. That is, the head $h$ of liquid pressure within the chamber X will in no case (under static conditions) exceed the bubble point pressure of the screen S. In the embodiment now under consideration the gas retention chamber Y is neither vented or charged with supplimental gas, and it is adapted to accommodate gas liberated through the screen S from the liquid L. In the event that operational parameters are exceeded and liquid percolates into chamber Y, evaporation will take place within and pressurize the chamber Y in excess of the bubble point pressure until said liquid is depleted therein. The surplus gas under increased pressure within chamber Y is then percolated reversely through the screen S and is absorbed in the liquid L, thereby effecting a purging action that clears the chamber Y for thermal insulation efficiently commensurate with the intended capabilities of the device. It is to be understood that in actual practice measures will be taken to prevent explosions as and when the cryogen, for example, absorbs heat and liberates gas.

Referring to FIG. 4 of the drawings it is feasible to permit the membrane or screen S to lie next adjacent or contiguously against the containment wall W, providing interstices remain therebetween so as to establish the restraining gas retention chamber Y. A best example of this embodiment is the use of an unsupported or non-rigid screen S wherein the weave thereof establishes a multitude of cavities 30 that remain interconnected so that there is fluid communication therebetween. It is possible therefore for restraining gas to be retained under pressure between the screen S, for example a screen of more heat conductive material, and wall W and to serve as a gas insulator, even when the screen S contiguously touches the wall W. However, it is preferred that the screen S does not touch the wall W, as shown in FIGS. 1 through 3, thereby to avoid direct mechanical heat absorption from said screen into said wall.

Referring now to the third embodiment illustrated in FIG. 5 of the drawings it is feasible to separate isolated liquids within liquid chambers X1 and X2 defined by spaced surface tension membranes or screens S1 and S2. For purpose of illustration a nuclear element or high heat source N is shown centrally located within the containment wall W, a single exterior containment wall; and in addition to the primary thermo-isolation from said containment wall, there are the separated liquid bodies which occupy the liquid chambers X1 and X2. The purpose of this stepped or graduated thermo-isolation is to control the thermal gradiant to the containment wall from an intense heat source such as in a nuclear reactor N. For example, the heat source N is immersed in a first body of liquid sodium at extremely high temperature and constrained within the porous membrane S1, there being a gas retention chamber Y1 intermediate said membrane and a surrounding porous membrane S2. The spaced membranes S1 and S2 are surrounded by a second body of liquid sodium at moderately high temperature constrained between said membrane S2 and the membrane S hereinabove described. It will be seen that the screens S1 and S2 form a gas pocket, preferably a surrounding gas pocket, that isolates the differential heat intensities within chambers X1 and X2, and to the end that the very or extremely hot liquid in the first mentioned chamber X1 does not mix by means of convection or otherwise with the moderately hot liquid in the second mentioned chamber X2; thereby affording a boundry layer in chamber Y1 characterized by opposed liquid-to-gas interfaces established by the spaced screens S1 and S2. Although not shown, the screens are supported from the wall W or the like, the liquids and gases are suitably introduced and controlled, and the heat source made accessible, all as hereinabove indicated and as may be required.

From the foregoing it will be seen that liquid is constrained within the confines of a porous membrane or screen S through which it tends to percolate. However, the percolation or escape of liquid through the screen S is prevented, partially or completely, and controlled by means of establishing a liquid-gas interface at the side of the screen S opposite that which constrains the said liquid. This liquid-gas interface is maintained by means of containment of a restraining gas under a retention pressure and applying it to the side of the screen S opposite that which constrains the said liquid. The gas retention pressure applied can vary up to the bubble point pressure practice the membrane or screen S and in actual practied should not exceed it, unless there is a subsequent reason to recharge gas G through the screen S and into the liquid L. In applications where gravity is involved, there will be inherent convection flow of both liquid L and gas G, however where weightlessness prevails there will be no convection currents; and regardless of which condition prevails this thermo device remains operative as herein disclosed. It is the liquid-gas interface in the surface tension device which is established and maintained by means of the restraining gas G under retention pressure and which in itself is the heat-cold isolator or insulator. The heat loses from this thermodynamic control device can be accounted for through radiation and through absorption in the gas medium. Therefore, it is preferred to maintain some space separation between the porous membrane or screen S and imperforate containment wall W, to thereby minimize heat or cold loses which are in practice reduced to a practical minimum inherently due to the relatively low density of the insulating gas G.

Having described only a typical preferred form and application of my invention, I do not wish to be limited or restricted to the specific details herein set forth, but wish to reserve to myself any modifications or variations that may appear to those skilled in the art.

Having described my invention, I claim:

1. A thermodynamic control device for preventing the transfer of heat or cold out of a liquid and comprising, a porous surface tension barrier with one side defining a liquid chamber containing a liquid therein at a head of pressure not exceeding the bubble point pressure of said porous surface tension barrier, a containment wall next adjacent to the other side of the said barrier and defining a gas retention chamber therebetween, and means retaining a restraining gas in said second mentioned chamber, whereby liquid in the first mentioned chamber is constrained from escaping into the second mentioned chamber and whereby the retained gas acts as an insulator.

2. The thermodynamic control device as set forth in claim 1 and wherein the porous surface tension barrier is a fine mesh screen.

3. The thermodynamic control device as set forth in claim 1, wherein the second mentioned chamber is closed and is chargeable with said restraining gas, and wherein the means retaining a restraining gas is a pressure control means retaining the restraining gas in said second mentioned chamber at the said bubble point pressure of said porous surface tension device.

4. The thermodynamic control device as set forth in claim 1, wherein the second mentioned chamber is closed and is chargeable with said restraining gas, and wherein the means retaining a restraining gas is a pressure control means retaining the restraining gas in said second mentioned chamber to but not exceeding the said bubble point pressure of said porous surface tension device.

5. The thermodynamic device for controlling the thermal gradient of heat from a high intensity heat source immersed in a liquid and comprising, a first porous surface tension barrier with one side defining a first liquid chamber for containing a first body of liquid with said heat source immersed therein, a second mentioned porous surface tension barrier with one side spaced from the first mentioned porous surface tension barrier and with its other side defining a second body of liquid isolated from said first body of liquid by a restraining gas retained in a first gas retention chamber defined between said first and second porous surface tension barriers, a third porous surface tension barrier with one side spaced from the second mentioned porous surface tension barrier also to define said second liquid chamber and for confining said second body of liquid, a containment wall next adjacent to the other side of the third mentioned porous surface tension barrier and defining a second gas retention chamber therebetween, and means for retaining restraining gas in said first and second mentioned gas retention chambers whereby liquid in the first and second mentioned liquid chambers is constrained from escaping into the said first and second mentioned gas retention chambers and whereby the retained gases act as insulators.

6. The thermodynamic device for control as set forth in claim 5 and wherein the porous surface tension barriers are fine mesh screens.

7. The thermodynamic device for control as set forth in claim 5 wherein the means retaining a restraining gas is a pressure control means retaining the restraining gas in said second mentioned chamber at less than the bubble point pressure of said porous surface tension device.

8. The thermodynamic device for control as set forth in claim 5 wherein the porous surface tension barriers have a bubble point pressure at which point said first and second bodies of liquid will escape therethrough, and wherein means pressurizes the restraining gases in the first and second mentioned gas retention chambers to but not exceeding said bubble point pressure.

9. The thermodynamic device for control as set forth in claim 5 wherein the first and second mentioned gas retention chambers are closed and chargeable with said restraining gases.

10. The thermodynamic device for control as set forth in claim 5, wherein the first and second mentioned gas retention chambers are closed, and wherein the means retaining restraining gas charges the same into and at regulated pressures not to exceed the bubble point pressures of the first and second mentioned and third mentioned porous surface tension barriers respectively, the pressure at which points said first and second mentioned bodies of liquid will escape therethrough respectively.

11. A thermodynamic control device for preventing the transfer of heat or cold out of a liquid and comprising, a porous surface tension barrier with one side defining a liquid chamber containing a liquid therein at a pressure not exceeding the normal bubble point pressure of said porous surface tension barrier, a containment wall next adjacent to the other side of said barrier and with separators defining a compartmented gas retension chamber therebetween, and means pressurizing the restraining gas in each compartment of the second mentioned chamber to but not exceeding said bubble point pressure of the liquid opposite and thereto in the first mentioned chamber.

12. The thermodynamic control device as set forth in claim 11 wherein gravity effects a liquid head of pressure in the first mentioned chamber hot in excess of the normal bubble point pressure of the porous surface tension barrier, the pressure at which point said liquid will escape therethrough, wherein the second mentioned chamber is compartmented as it extends vertically and wherein means pressurizes the restraining gas in each compartment of the second mentioned chamber to but not exceeding said bubble point pressure of the liquid opposite thereto in the first mentioned chamber.

13. The thermodynamic control device as set forth in claim 11 wherein the second mentioned chamber is closed and wherein said means retaining a restraining gas regulates the pressure thereof not to exceed the bubble point pressure of said porous surface tension barrier, the pressure at which point said liquid will escape therethrough.

* * * * *